United States Patent
Nishiyama

(10) Patent No.: US 9,613,754 B2
(45) Date of Patent: Apr. 4, 2017

(54) LAMINATED FILM CAPACITOR, CAPACITOR MODULE, AND POWER CONVERSION SYSTEM

(71) Applicant: Murata Manufacturing Co., Ltd., Nagaokakyo-shi, Kyoto-fu (JP)

(72) Inventor: Shigeki Nishiyama, Nagaokakyo (JP)

(73) Assignee: MURATA MANUFACTURING CO., LTD., Nagakakyo-Shi, Kyoto-Fu (JP)

(*) Notice: Subject to any disclaimer, the term of this patent is extended or adjusted under 35 U.S.C. 154(b) by 216 days.

(21) Appl. No.: 14/632,715

(22) Filed: Feb. 26, 2015

(65) Prior Publication Data

US 2015/0255217 A1 Sep. 10, 2015

(30) Foreign Application Priority Data

Mar. 7, 2014 (JP) .................................. 2014-045435

(51) Int. Cl.
| | |
|---|---|
| *H01G 2/08* | (2006.01) |
| *H01G 4/015* | (2006.01) |
| *H01G 4/30* | (2006.01) |
| *H01G 4/012* | (2006.01) |
| *H01G 4/12* | (2006.01) |
| *H01G 4/232* | (2006.01) |
| *H02P 27/06* | (2006.01) |

(52) U.S. Cl.
CPC ............... *H01G 4/30* (2013.01); *H01G 4/012* (2013.01); *H01G 4/12* (2013.01); *H01G 4/232* (2013.01); *H02P 27/06* (2013.01)

(58) Field of Classification Search
CPC  H01G 2/08; H01G 4/015; H01G 4/30; H01G 4/012; H01G 4/12; H01G 4/232; H02M 7/003; H02P 27/06

USPC ........................................... 361/274.1, 301.4
See application file for complete search history.

(56) References Cited

U.S. PATENT DOCUMENTS

| | | | | |
|---|---|---|---|---|
| 5,388,024 A | * | 2/1995 | Galvagni | ............... H01G 2/065 29/25.42 |
| 5,566,054 A | * | 10/1996 | Sato | ......................... H01G 9/15 174/520 |
| 5,973,906 A | | 10/1999 | Stevenson et al. | |
| 2008/0310075 A1 | * | 12/2008 | Takeoka | .................. H01G 4/01 361/301.5 |

FOREIGN PATENT DOCUMENTS

| | | |
|---|---|---|
| JP | H01-244604 A | 9/1989 |
| JP | H10-261542 A | 9/1998 |
| JP | 2013-198367 A | 9/2013 |

OTHER PUBLICATIONS

Japanese Office Action dated Feb. 9, 2016 issued for counterpart application JP2014-045435 (with english translation).

* cited by examiner

*Primary Examiner* — Eric Thomas
*Assistant Examiner* — Michael P McFadden
(74) *Attorney, Agent, or Firm* — Arent Fox LLP

(57) ABSTRACT

A laminated film capacitor that includes a laminated body having alternately stacked first dielectric films with respective first internal electrodes and second dielectric films with respective second internal electrodes, a first metallikon part connected to the first internal electrodes, and a second metallikon part connected to the second internal electrodes, and the laminated body has principal surfaces in the shape of a trapezoid as viewed from the stacking direction of the first dielectric films and the second dielectric films.

11 Claims, 12 Drawing Sheets a-a CROSS-
SECTIONAL VIEW a-a CROSS-
SECTIONAL VIEW a-a CROSS-
SECTIONAL VIEW

LAMINATED FILM CAPACITOR, CAPACITOR MODULE, AND POWER CONVERSION SYSTEM

BACKGROUND OF THE INVENTION

1. Field of the Invention

The present invention relates to a laminated film capacitor, a capacitor module, and a power conversion system.

2. Description of the Related Art

In hybrid cars with three-phase motors loaded, the three-phase motors are operated by power supplied from in-car batteries to drive a driving wheel in power running, whereas the in-car batteries are charged with power regenerated by the three-phase motors in breaking.

For this reason, capacitors and inverters for achieving the conversion of direct-current power and alternating-current power are connected between the three-phase motors and the in-car batteries.

JP 2013-198367 A discloses a motor device including a capacitor and inverter, for the achievement of the power conversion. The capacitor of the motor device is a hollow cylinder-type capacitor with a hollow section surrounding a rotation axis (central axis line) of the motor device.

This hollow cylinder-type capacitor is structured to have a thin-film dielectric sandwiched by two electrode plates, which is spirally wound to go around the rotation axis of the motor device.

SUMMARY OF THE INVENTION

The hollow cylinder-type capacitor disclosed in JP 2013-198367 A is structured to have the two electrode plates and the dielectric spirally wound so as to go around the rotation axis of the motor, as described previously. Therefore, for example, when a defect of the dielectric degrades insulation performance between the electrode plates to cause, at a specific location, trouble such as short-circuit current flowing through the hollow cylinder-type capacitor, it is not possible to remove any portion including the specific location.

For this reason, even when trouble is caused at a tiny location, the entire hollow cylinder-type capacitor has to be replaced. For this reason, there is a problem of high cost for the replacement.

The present invention has been achieved in view of the actual circumstances mentioned above, and an object of the present invention is to provide a laminated film capacitor, a capacitor module, and a power conversion system which are able to keep replacement cost down by facilitating the replacement.

In order to achieve the object, the laminated film capacitor according to a first aspect of the present invention is a laminated film capacitor including:

a laminated body obtained by alternately stacking more than one first film with a first internal electrode formed on a dielectric film and second film with a second internal electrode formed on a dielectric film;

a first electrode connected to the first internal electrode; and a second electrode connected to the second internal electrode, wherein the laminated body has a principal surface in the shape of a trapezoid as viewed from the stacking direction of the first films and second films.

Furthermore, the capacitor module according to a second aspect of the present invention has a plurality of laminated film capacitors formed in the shape of a ring by bringing one side surface of the laminated film capacitor, the one side surface including an assembly of one of the two sides except an upper base and a lower base among sides constituting the trapezoidal principal surface, and the other side surface of the laminated film capacitor, the other side surface including an assembly of the other of the two sides, into contact with one side surface of the other laminated film capacitor and the other side surface of the other laminated film capacitor to arrange the laminated film capacitors in the same plane.

Furthermore, in the capacitor module, the intersection angle at the intersection on extensions of the two sides except the upper base and the lower base among the sides constituting the trapezoidal principal surface may meet the relationship of 360°/n when the number of the capacitor modules arranged in the same plane is denoted by n.

Furthermore, the power conversion system according to a third aspect of the present invention includes:

a power conversion device that converts input direct-current power to alternating-current power or converts input alternating-current power to direct-current power, and outputs the power;

a motor that operates with power output from the power conversion device; and the above-described capacitor module reducing surge superimposed on a direct-current voltage input to the power conversion device or reducing surge superimposed on a direct-current voltage output from the power conversion device, with a rotation axis of the motor inserted into the ring-shaped opening.

According to the present invention, it is possible to keep down the cost for the replacement of capacitors by allowing partial replacement of the capacitors.

DETAILED DESCRIPTION OF THE INVENTION

Embodiment 1

Laminated film capacitors 100 and a capacitor module assembly 300 according to an embodiment of the present invention will be described below.

Figure 1:
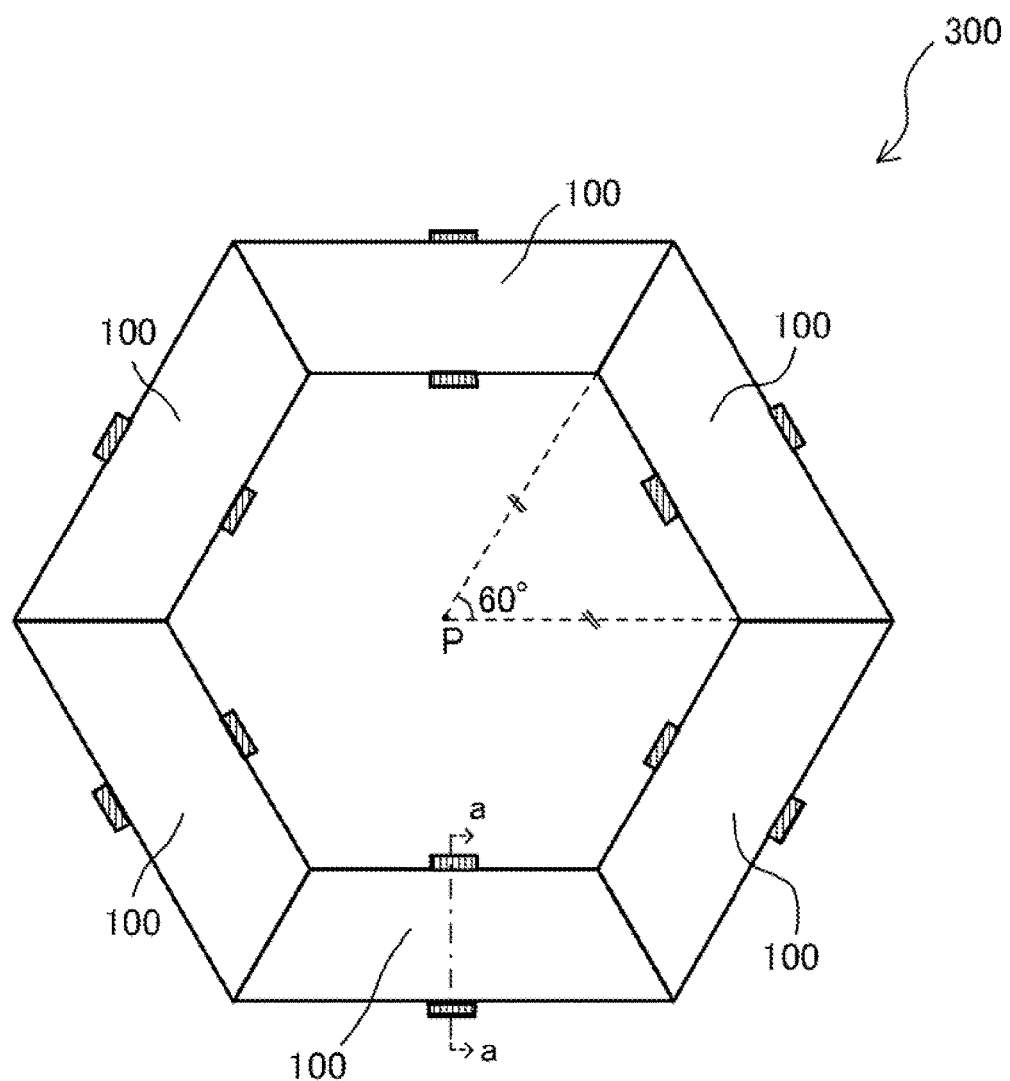
FIG. 1 is a diagram illustrating a general outline of a laminated film capacitor and a capacitor module assembly according to Embodiment 1 of the present invention.

As schematically shown in FIG. 1, the capacitor module assembly 300 is composed of six laminated film capacitors 100 in a trapezoidal shape in planar view, which are combined in the form of a ring.

First, each laminated film capacitor 100 will be described.

It is to be noted that to facilitate understanding, the x, y, and z axes in orthogonal coordinate systems are set as indicated in the respective drawings, and referenced appropriately. The z direction refers to the stacking direction of films constituting the laminated film capacitors 100, the x direction refers to a direction perpendicular to the upper bases and lower bases of the trapezoidal laminated film capacitors 100, and the y direction refers to a direction parallel to the upper bases and lower bases of the trapezoidal laminated film capacitors 100.

Figure 2:
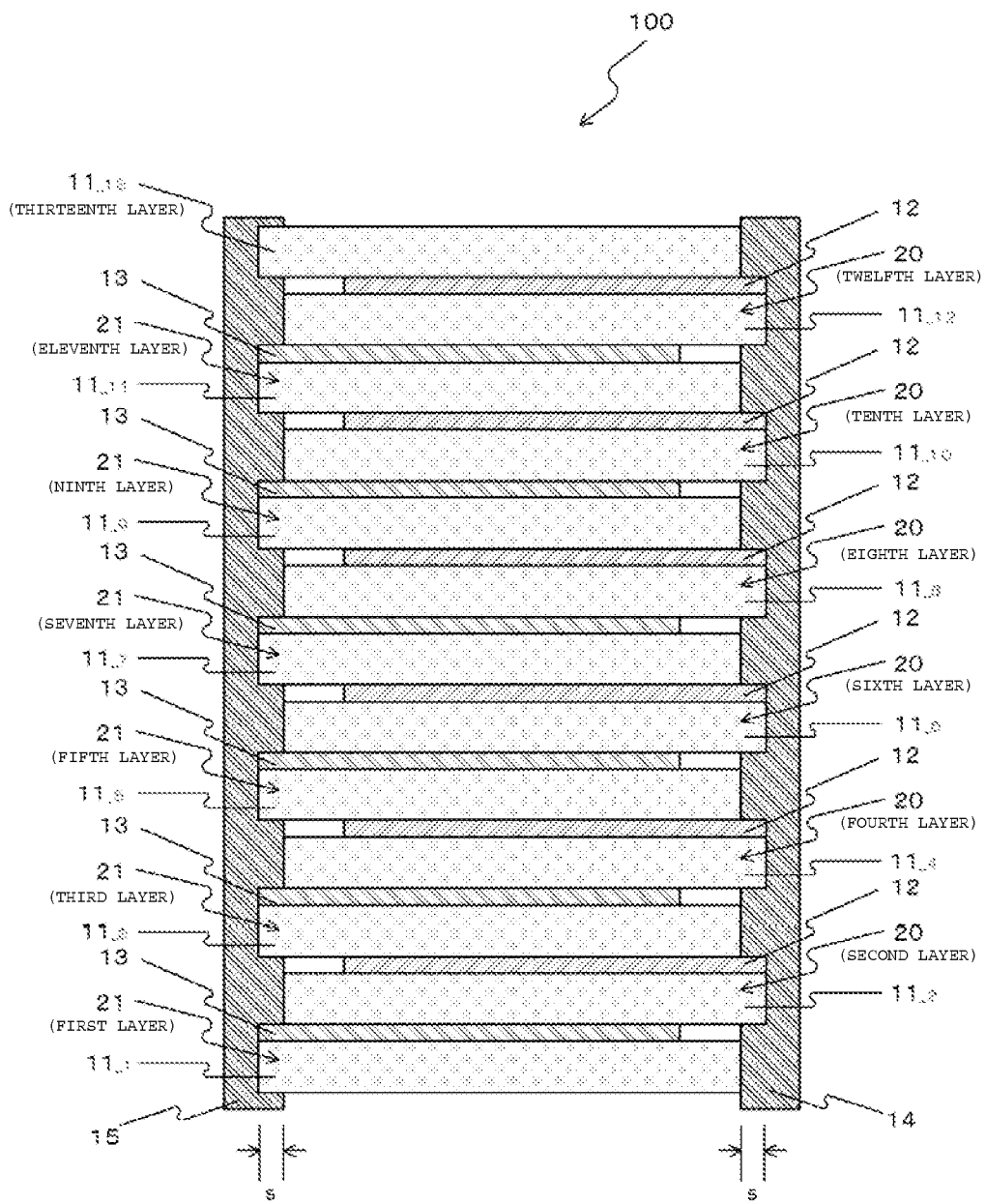
FIG. 2 is a cross-sectional view of the laminated film capacitor shown in FIG. 1.

The laminated film capacitor 100 includes, as shown in the cross-sectional view (the cross section of a-a shown in FIG. 1) of FIG. 2, dielectric films 11 ($11_{\_1}$ to $11_{\_13}$), first internal electrodes 12 and second internal electrodes 13 placed on the dielectric films 11, a first metallikon part 14, and a second metallikon part 15.

It is to be noted that while the laminated film capacitor 100 with the thirteen dielectric films 11 stacked is shown in FIG. 2 for facilitating the understanding of the invention, the stacking number in the laminated film capacitors 100 is not to be considered limited to this number.

The dielectric films 11 are formed from a dielectric material such as a resin, and formed in a trapezoidal shape in planar view. The dielectric films $11_{\_1}$ to $11_{\_13}$ are formed in the same shape with respect to one another.

The first internal electrode 12 is formed on one surface of the dielectric film 11. The dielectric film 11 with the first internal electrode 12 formed thereon will be hereinafter referred to as a first film 20.

The second internal electrode 13 is formed on one surface of the dielectric film 11. The dielectric film 11 with the second internal electrode 13 formed thereon will be hereinafter referred to as a second film 21.

The first internal electrodes 12 and the second internal electrodes 13 are opposed to each other with the dielectric films 11 interposed therebetween to form capacitance.

The first films 20 and the second films 21 are displaced by an offset s from each other in the x direction, and stacked in the z direction with both ends aligned in the y direction respectively.

The uppermost layer of the dielectric layer $11_{\_13}$ is, without any electrode formed thereon, intended to insulate and protect the first internal electrode 12.

The first metallikon part 14 is a conductive film (electrode) placed on one lateral side in the x direction of the laminated body, and connected commonly to the first internal electrodes 12. The first metallikon part 14 is formed by treatment of spraying a conductive thermal spray material melted by heating, onto one lateral side of the first films 20 (metallikon).

The second metallikon part 15 is a conductive film (electrode) placed on the other lateral side in the x direction of the laminated body of the first films 20 and second films 21 stacked, and connected commonly to the second internal electrodes 13. The second metallikon part 15 is formed by metallikon.

Next, the first films 20 and second films 21 constituting the laminated film capacitors 100 will be described in detail with reference to FIG. 3.

Figure 3A:
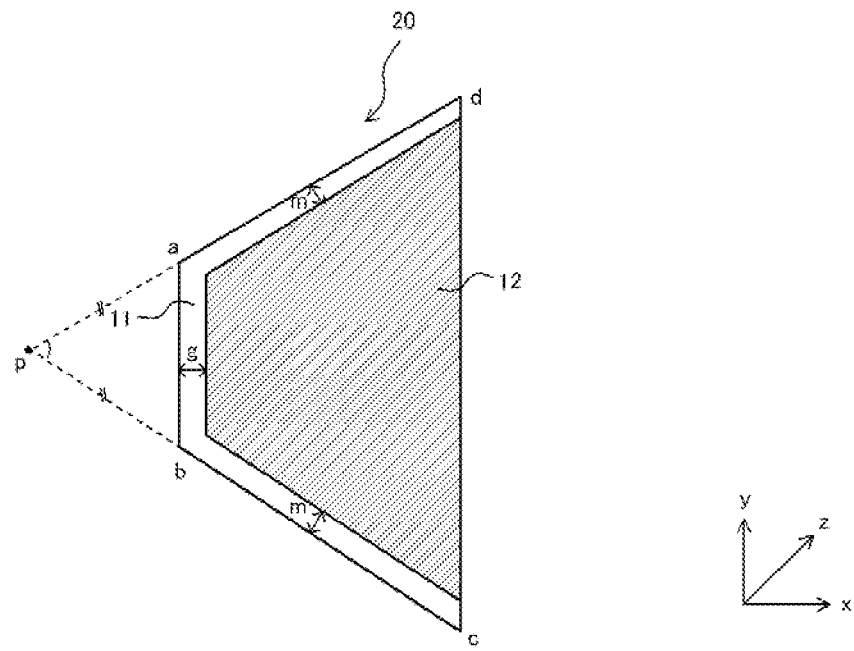
FIG. 3A is a front view of a first film shown in FIG. 2.

As shown in FIG. 3A, the dielectric film 11 constituting the first film 20 is formed in a trapezoidal shape. The dielectric film 11 has an upper base (for example, a side ab), for example, on the order of several tens mm, the dielectric film 11 has a lower base (for example, a side cd), for example, on the order of several tens mm to several hundreds mm, and the dielectric film 11 has a thickness, for example, on the order of several μ to several tens μm.

Among the four sides of the dielectric films 11, the upper base ab and the lower base cd are formed parallel, while the side bc and the side ad are formed so that extensions of the sides intersect at 60°.

In addition, the dielectric film 11 is formed so that two straight lines connecting the intersection p of the extensions with both ends of the side ab are equal in length to each other (the side pa is equal to the side pb), and two straight lines connecting the intersection p with both ends of the side cd are equal in length to each other (the side pc is equal to the side pd).

The first internal electrode 12 is formed by depositing a metal such as Al, Cu, and Ag on the dielectric film 11, and subjecting the deposited film to patterning. The first internal electrode 12 is formed to reach the lower base cd in order to connect to the metallikon part 14, and to the location just at a distance m apart from the other sides ad and bc in order to ensure insulation. In addition, the electrode is formed to the location just at a distance g apart from the upper side ab. It is to be noted that the distance g and the distance m may be equal or different.

Figure 3B:
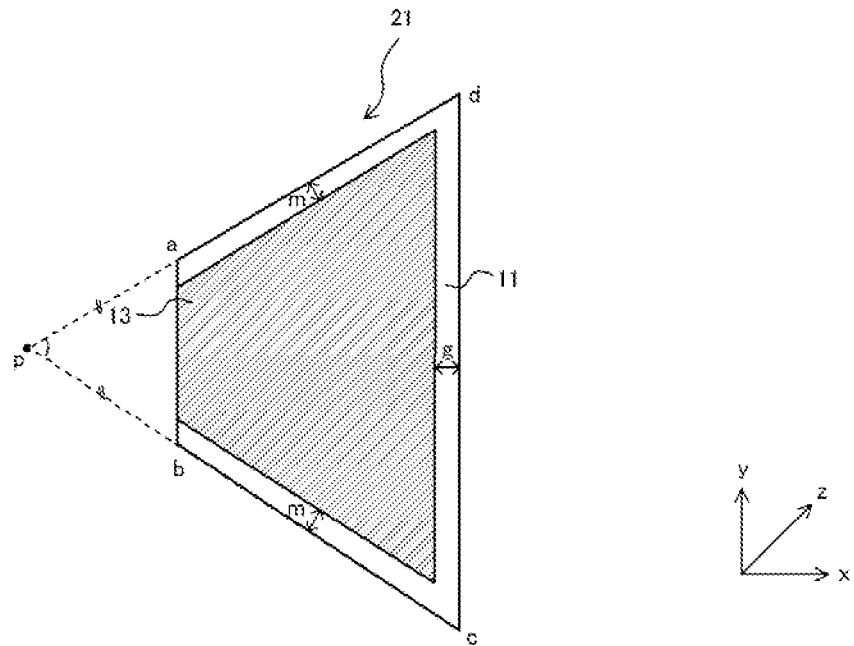
FIG. 3B is a front view of a second film shown in FIG. 2.

As shown in FIG. 3B, the dielectric film 11 of the second film 21 has the same shape and size as the dielectric film 11 of the first film 20.

The second internal electrode 13 is formed by depositing a metal such as Al, Cu, and Ag on the dielectric film 11, and subjecting the deposited film to patterning. The second internal electrode 13 is formed to reach the upper base ab in order to connect to the metallikon part 15, and to the location just at a distance m apart from the other sides ad and bc in order to ensure insulation. In addition, the electrode is formed to the location just at a distance g apart from the lower side cd. It is to be noted that the distance g and the distance m may be equal or different.

Next, a method for manufacturing the laminated film capacitor 100 configured as described above will be described with reference to FIGS. 4 and 5.

Figure 4A:
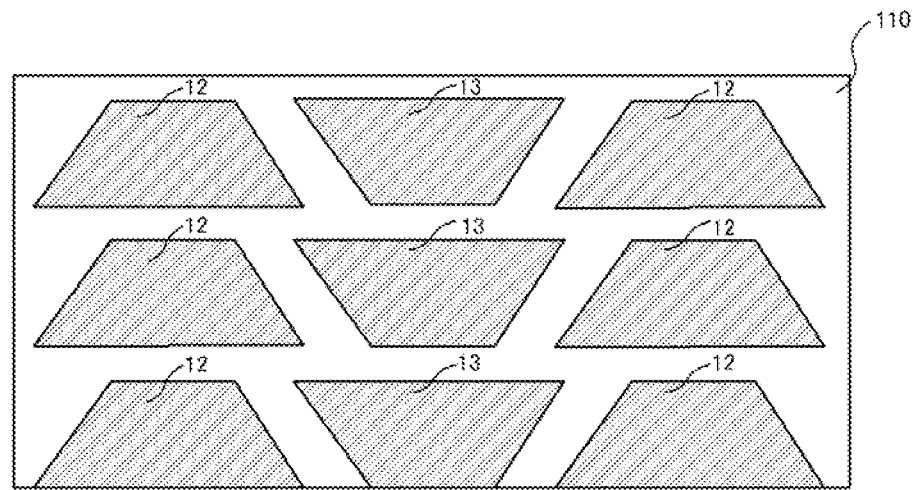
FIGS. 4A to 4C are diagrams for explaining a process for manufacturing the first film and the second film.

First, a dielectric film plate 110 is prepared, and on one wide surface thereof, a predetermined number of metallic films in patterns corresponding to the first internal electrodes 12 and second internal electrodes 13 are formed by vapor deposition and patterning as shown in FIG. 4A.

Figure 4B:
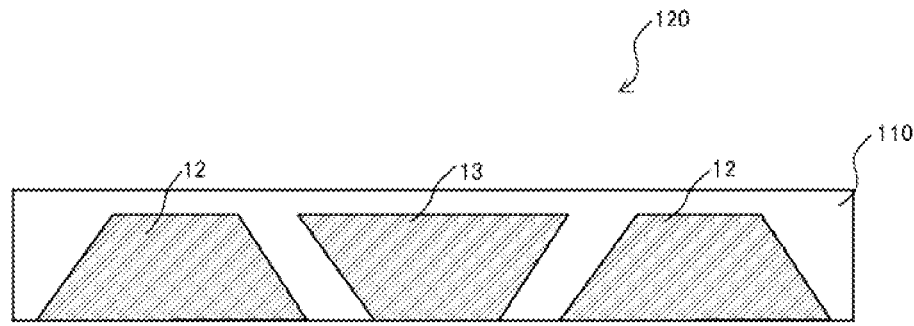

Thereafter, the dielectric film plate 110 is cut in the width direction to manufacture a continuous body 120 with a series of first internal electrodes 12 and second internal electrodes 13 as shown in FIG. 4B.

Figure 4C:
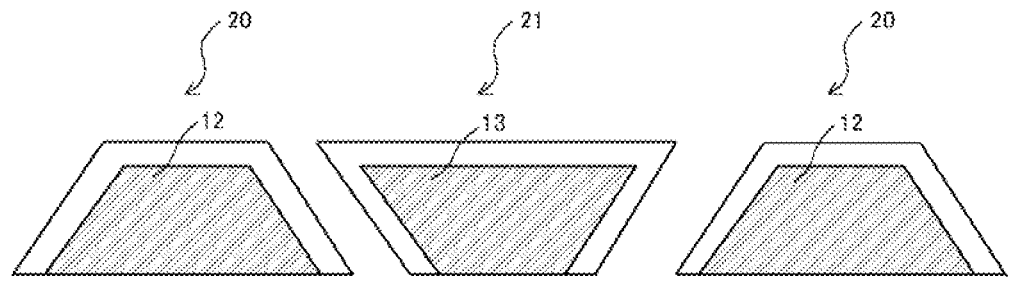

Subsequently, the continuous body 120 is cut so as to separate the first internal electrodes 12 and the second internal electrodes 13 from each other, thereby manufacturing first films 20 and second films 21 as shown in FIG. 4C.

Figure 5A:
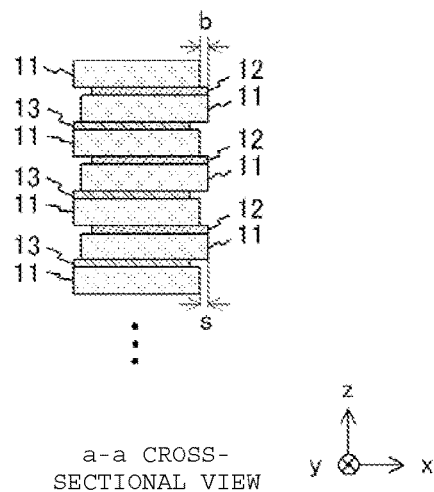
FIGS. 5A to 5C are diagrams for explaining a process for manufacturing a laminated film capacitor.

Next, the first films 20 and the second films 21 are alternately stacked in the z direction. In this case, the first films 20 and the second films 21 are stacked with displacement just by an offset s in the x direction as shown in FIG. 5A, with both ends in the y direction aligned with each other. In addition, a dielectric film 11 of the same size as the films 20 and 21 with no metallic film formed is stacked for the uppermost layer in order to insulate and protect the internal electrode.

Thereafter, these films are subjected to a pressure bonding treatment to form a laminated body. In this case, end regions of the dielectric films 11 with a width of m without the electrode 12 or 13 formed are mutually attached firmly to insulate the first internal electrodes 12 and the second internal electrodes 13 from the outside.

Figure 5B:
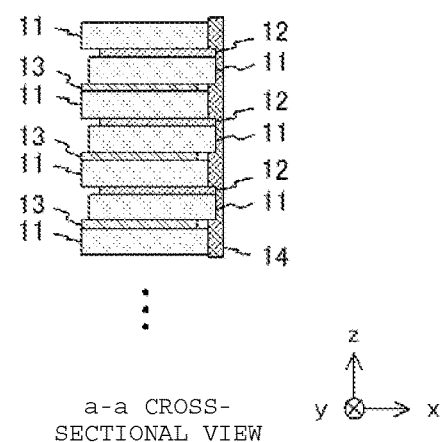

Thereafter, as shown in FIG. 5B, a conductive thermal spray material is sprayed by metallikon onto one lateral side of the laminated body in the x direction to form a first metallikon part 14 connected to ends of the first internal electrodes 12. Thus, the first internal electrodes 12 and the first metallikon part 14 are mutually connected electrically.

Figure 5C:
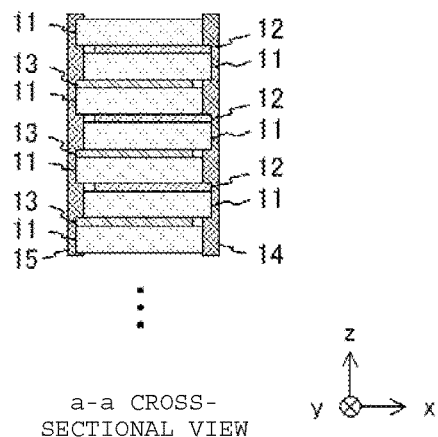

Subsequently, as shown in FIG. 5C, a second metallikon part 15 connected to ends of the second internal electrodes 13 is formed by metallikon on the other lateral side of the laminated body in the x direction. Thus, the plurality of second internal electrodes 13 and the second metallikon part 15 are mutually connected electrically.

Figure 6A:
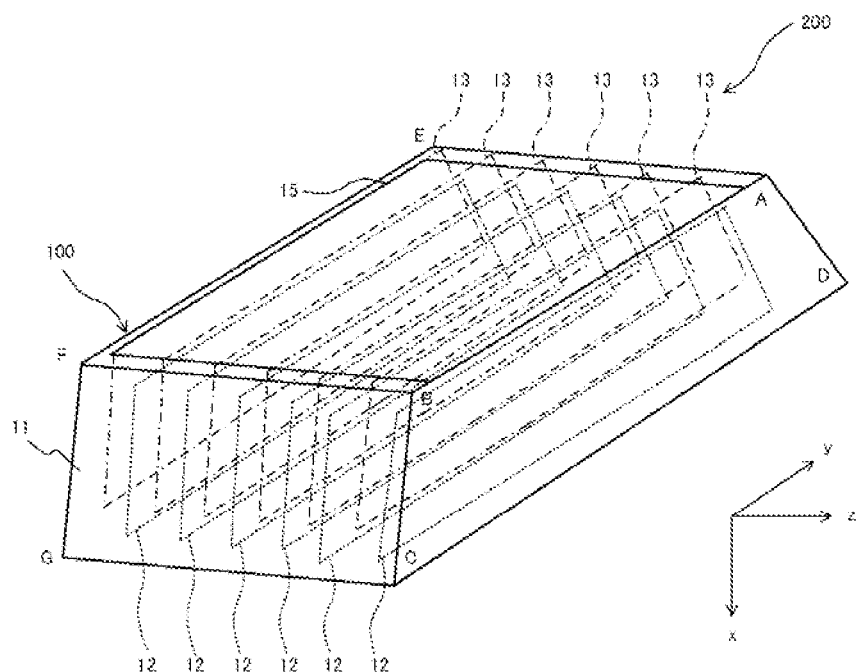
FIG. 6A is a perspective view of a laminated film capacitor according to Embodiment 1.

In the case of the thus manufactured laminated film capacitor 100, as shown in FIG. 6A, the laminated body has principal surfaces (face ABCD and face EFGH) in the shape of a trapezoid as viewed from the stacking direction of the first films 20 and second films 21. In addition, in the case of the laminated film capacitor 100, the principal surfaces (face ABCD and face EFGH) of the laminated body are parallel to each other.

Figure 6B:
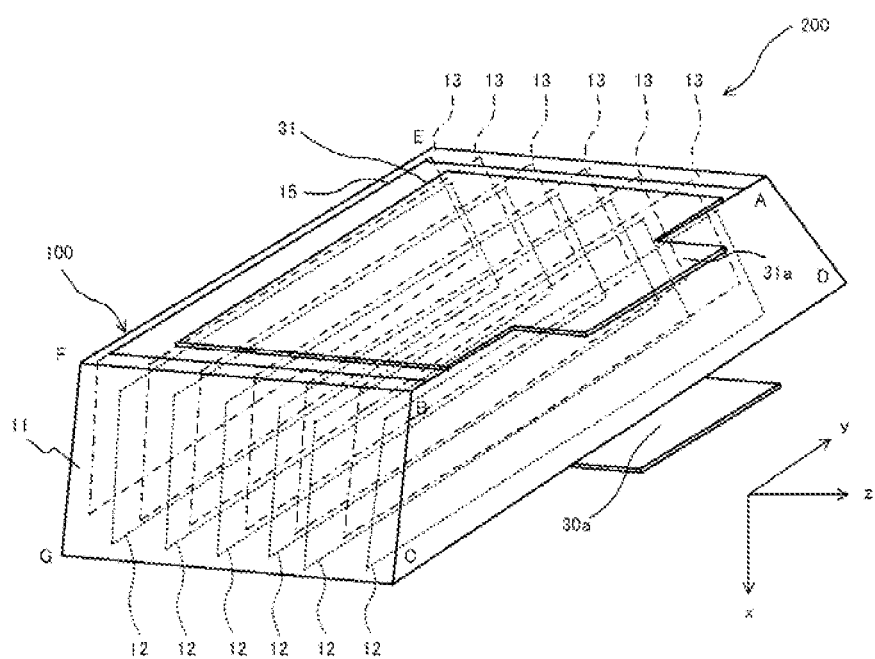
FIG. 6B is a perspective view of a capacitor module according to Embodiment 1.

A capacitor module 200 is manufactured by, as shown in FIG. 6B, attaching a first external electrode (bus bar) 30 and a second external electrode (bus bar) 31 respectively to the first metallikon part 14 (the first metallikon part 14 is hidden at the lower surface, thus not drawn in the drawing) and second metallikon part 15 of the laminated film capacitor 100 manufactured.

The first external electrode (bus bar) 30 and the second external electrode (bus bar) 31 are metallic plates for connecting the laminated film capacitor 100 to an external circuit. The first external electrode 30 and the second external electrode 31 are connected respectively to the metallikon parts 14 and 15 by, for example, pressure bonding, plating, or the like.

The first external electrode 30 includes a first external electrode terminal 30a for external circuit connection, whereas the second external electrode 31 includes a second external electrode terminal 31a for external circuit connection.

It is to be noted that the capacitor module 200 is housed in a container (a container with an outline similar to the outline of the capacitor module 200), and fixed with a sealing material filling the container. The container and sealing material are omitted in the drawings.

Figure 7A:
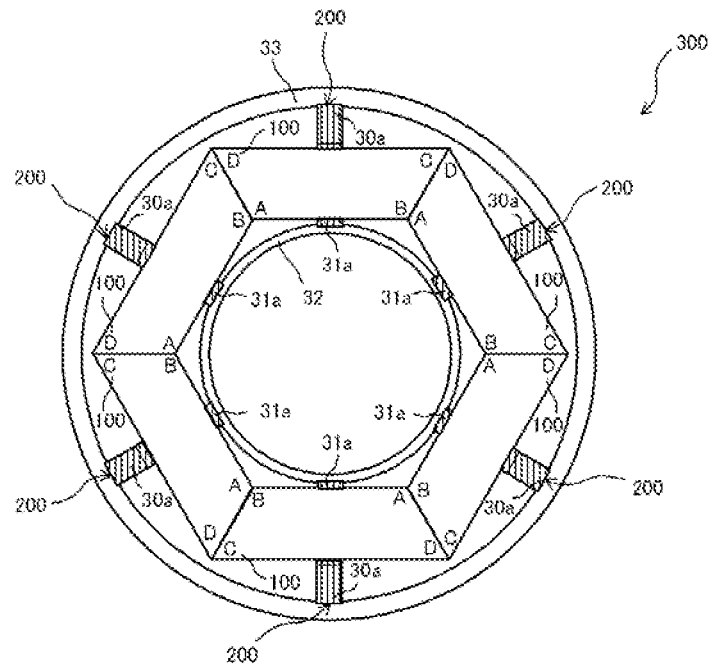
FIG. 7A is a front view of a capacitor module assembly according to Embodiment 1.
Figure 7B:
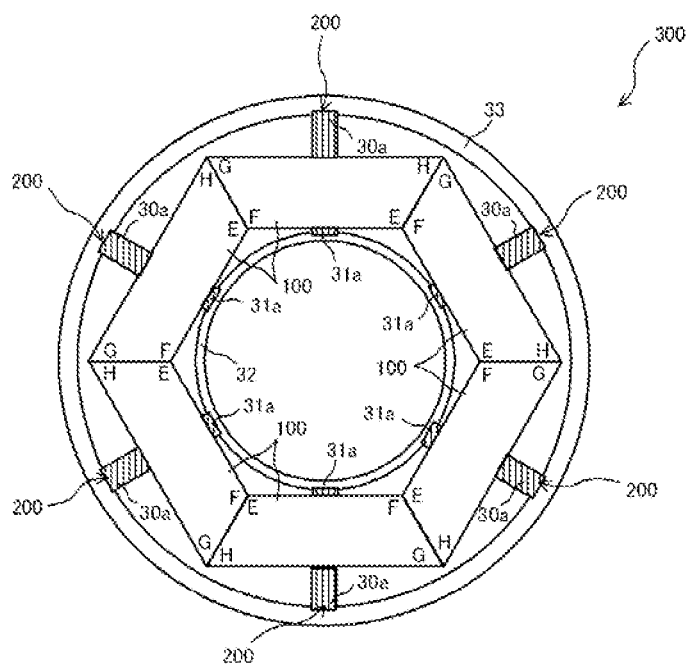
FIG. 7B is a back view thereof.

The single laminated film capacitor 100 and the capacitor module 200 with terminals connected to the laminated film capacitor 100 have been described above. Next, a ring-shaped capacitor module assembly 300 composed of a plurality of capacitor modules 200 will be described with reference to FIGS. 7A and 7B.

The capacitor module assembly 300 has six capacitor modules 200 arranged in the shape of a ring by bringing one y-direction lateral side (side surface ADHE) and the other lateral side (side surface BCGF) of one capacitor module 200 respectively into contact with the other lateral side (side surface BCGF) and one lateral side (side surface ADHE) of other capacitor modules 200 to arrange the six modules in the same plane.

The six capacitor modules 200 arranged in the shape of a ring have first external electrode terminals 30a mutually connected by an annular first wiring 32. The first wiring 32 is, for example, welded on the first external electrode terminals 30a. Likewise, the six capacitor modules 200 have second external electrode terminals 31a connected by welding to an annular second wiring 33.

Figure 8:
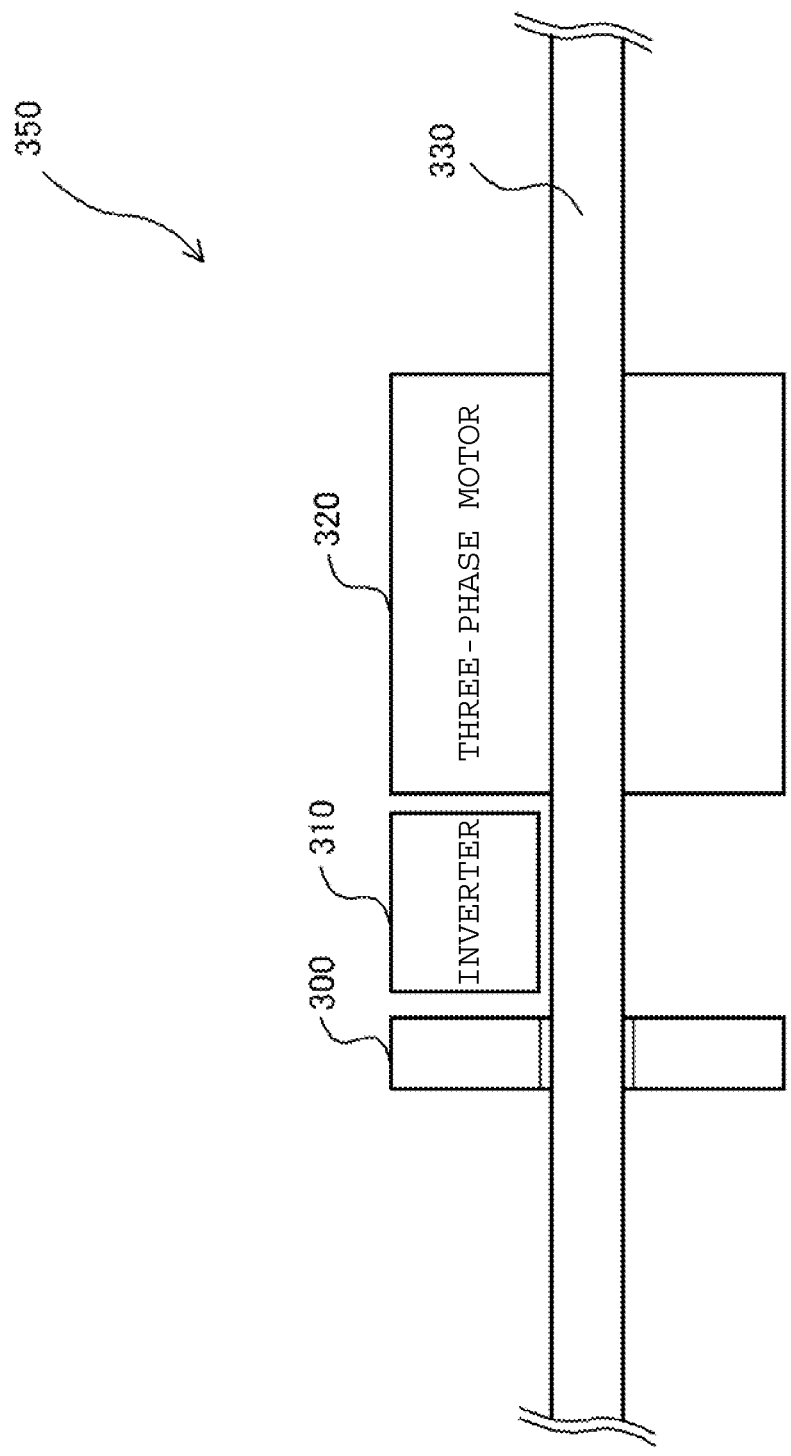
FIG. 8 is a block diagram of a power conversion system which uses a capacitor module assembly according to Embodiment 1.

This capacitor module assembly 300 is, for example, as shown in FIG. 8, loaded onto a power conversion system 350 including an inverter 310 and a three-phase motor 320 that operates with three-phase power output from the inverter 310.

The inverter 310 has, for example, an IGBT (Insulated Gate Bipolar Transistor), a control circuit for on-off control of the IGBT, etc. When direct-current power is supplied from a direct-current power supply such as a battery, the inverter 310 converts the direct-current power to three-phase power. Then, the inverter 310 supplies the three-phase power to the three-phase motor 320. On the other hand, when generated electric power (three-phase power) is supplied from the three-phase motor 320, the inverter 310 converts the three-phase power to direct-current power. Then, the inverter 310 supplies the direct-current power to a battery or the like.

The capacitor module assembly 300 is placed next to the inverter 310, with a rotation axis 330 of the three-phase motor 320 inserted into the opening, and the first wiring 32 and the second wiring 33 are each connected to a wiring for connecting the inverter 310 and a battery.

As described above, in the case of the capacitor module assembly 300, capacitor modules 200, and laminated film capacitors 100, the laminated body has principal surfaces (face ABCD and face EFGH) in the shape of a trapezoid as viewed from the stacking direction of the first films 20 and second films 21.

For this reason, it is possible to form the shape of a ring by bringing the side surface ADHE and side surface BCGF of one laminated film capacitor 100 or one capacitor module 200 into contact with the side surface ADHE and side surface BCGF of other laminated film capacitors 100 or other capacitor modules 200 to arrange the capacitors or modules in the same plane.

When one laminated film capacitor 100 or capacitor module 200 causes trouble among the laminated film capacitors 100 or capacitor modules 200 which form the ring shape (the aspect of going around once while the opening is formed), the troublesome laminated film capacitor 100 or capacitor module 200 may be replaced. Accordingly, the laminated film capacitors 100, capacitor modules 200, and capacitor module assembly 300 according to the present embodiment allow partial replacement of the capacitors, thereby keeping down the cost for the replacement of the capacitors.

Furthermore, the intersection angle meets the relationship of 360°/n (n represents the number of capacitor modules 200) at the intersection on extensions of the two sides except the upper base and lower base of the face ABCD (or face EFGH) of the laminated film capacitor 100 or capacitor module 200.

For this reason, in the case of achieving a ring shape with a plurality of laminated film capacitors 100 or capacitor modules 200, the laminated film capacitors 100 or the capacitor modules 200 can be arranged in contact with each other without any space therebetween. Accordingly, the laminated film capacitor 100, capacitor module 200, and capacitor module assembly 300 according to the present embodiment allow efficient use of space, as compared with a case of forming a ring shape with laminated film capacitors or film capacitors including, for example, cuboid dielectric films.

Furthermore, this placement of the capacitor module assembly 300 can, while making efficient use of dead space near the rotation axis 330 of the three-phase motor 320, reduce surge superimposed on the direct-current applied by the direct-current power supply to the inverter 310 in power running of the three-phase motor 320, and reduce surge superimposed on the direct-current voltage output from the inverter 310 in regenerative operation of the three-phase motor 320.

While an example of forming the first internal electrodes 12 and the second internal electrodes 13 with a metallic deposited film has been provided in the embodiment described above, the electrodes are able to be formed with any conductor. It is also possible to form the electrodes with, for example, metal foil. In this case, there is a possibility that ends (portions with no electrode formed) of the dielectric films 11 will not be attached firmly in the step of stacking and pressure bonding, depending on the thickness of the metal foil. In such a case, an insulating film of almost the same thickness as the metallic foil may be placed on the non-electrode formation regions with widths g and m, before stacking and pressure bonding.

In addition, there is no need for the widths g and m of the non-electrode formation regions to have constant value, but the widths g and m may be allowed to vary depending on locations, or differ between the first films 20 and the second films 21.

Embodiment 2

The above-described capacitor module 200 has the first external electrode terminal 30a and second external electrode terminal 31a placed on separate surfaces. However, the invention is not to be considered limited to this placement, but the first external electrode terminal 30a and the second external electrode terminal 31a may be placed on the same surface.

Figure 9A:
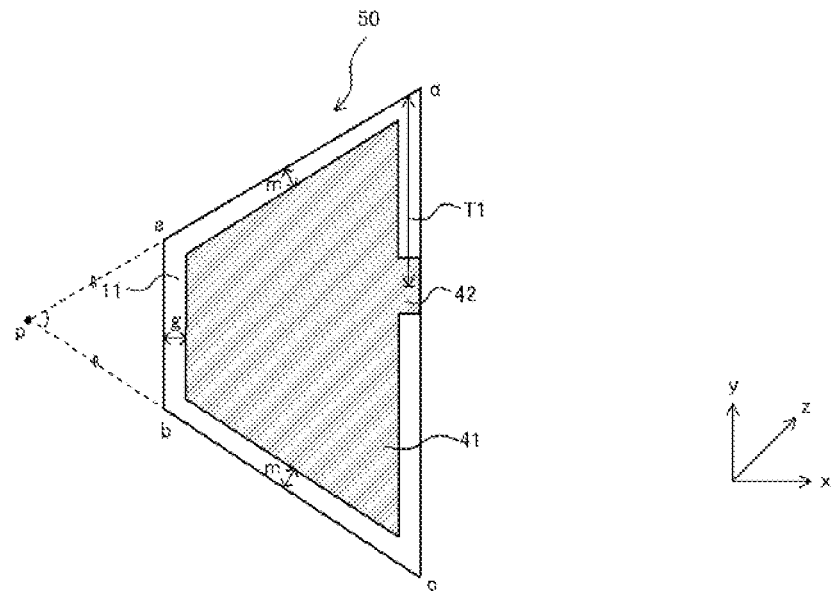
FIG. 9A is a front view of a first film according to Embodiment 2.
Figure 9B:
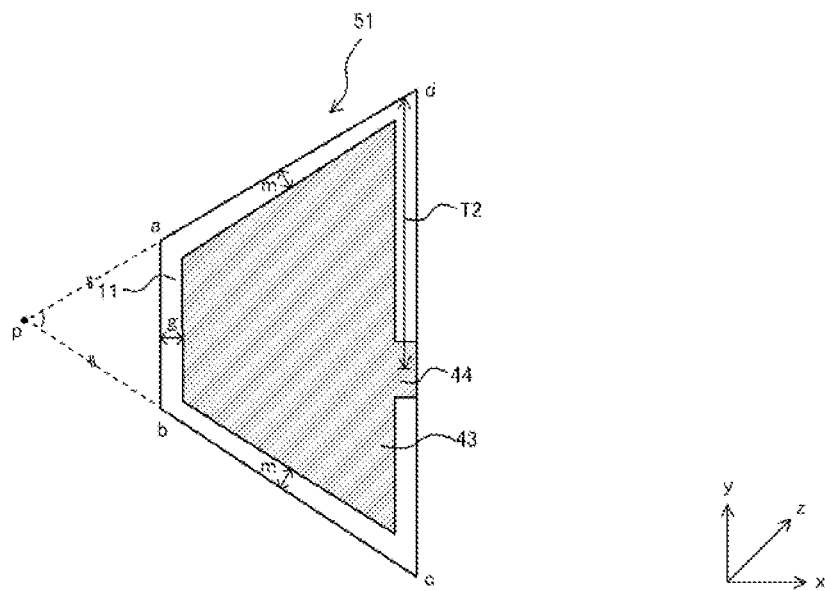
FIG. 9B is a front view of a second film according to Embodiment 2.

FIGS. 9A and 9B show a first film 50 and a second film 51 which allows a first external electrode terminal 30a and a second external electrode terminal 31a to be placed on the same surface.

The first film 50 includes a dielectric film 11 configured in the same fashion as in Embodiment 1, a first internal electrode 41 placed on a first surface of the dielectric film 11, and a first extraction conductor 42 connected to the first internal electrode 41.

The first internal electrode 41 is composed of a metallic film. This metallic film is a film of electric conductor such as Al, Cu, or Ag, which is formed from foil, a deposited film, or the like.

The rectangular first extraction conductor 42 is connected to the first internal electrode 41. The central part of the first extraction conductor 42 is located T1 away from a side ad. One end of the first extraction conductor 42 is connected to the first internal electrode 41, and the other end of the first extraction conductor 42 is formed in contact with the lower base cd of the dielectric film 11. The first extraction conductor 42 is, from foil, a deposited film, or the like, formed integrally with the first internal electrode 41.

It is to be noted that when the first internal electrode 41 and the extraction conductor 42 are formed from a metal foil, the small widths g and m may fail to eliminate the gap between upper and lower dielectric films 11 even after pressure bonding. In such a case, an insulating film may be formed around the first internal electrode 41 and the first extraction conductor 42.

The second film 51 includes a dielectric film 11 configured in the same fashion as in Embodiment 1, a second internal electrode 43 placed on a first surface of the dielectric film 11, and a second extraction conductor 44 connected to the second internal electrode 43.

The second internal electrode 43 is composed of a metallic film. This metallic film is a film of electric conductor such as Al, Cu, or Ag, which is formed from foil, a deposited film, or the like. The second internal electrode 43 is placed to be opposed to the first internal electrode 41, thereby forming capacitance.

The rectangular second extraction conductor 44 is connected to the second internal electrode 43. The central part of the second extraction conductor 44 is located T2 away from a side ad. One end of the second extraction conductor 44 is connected to the second internal electrode 43, and the other end of the second extraction conductor 44 is formed in contact with the lower base cd of the first surface of the dielectric film 11. The second extraction conductor 44 is, from foil, a deposited film, or the like, formed integrally with the second internal electrode 43.

As described above, the central part of the second extraction conductor 44 is located T2 away from the side ad, whereas the central part of the first extraction conductor 42 is located T1 away from the side ad, and the first extraction conductor 42 is not overlapped with, but located at a certain distance from the second extraction conductor 44 in planar view.

Figure 10:
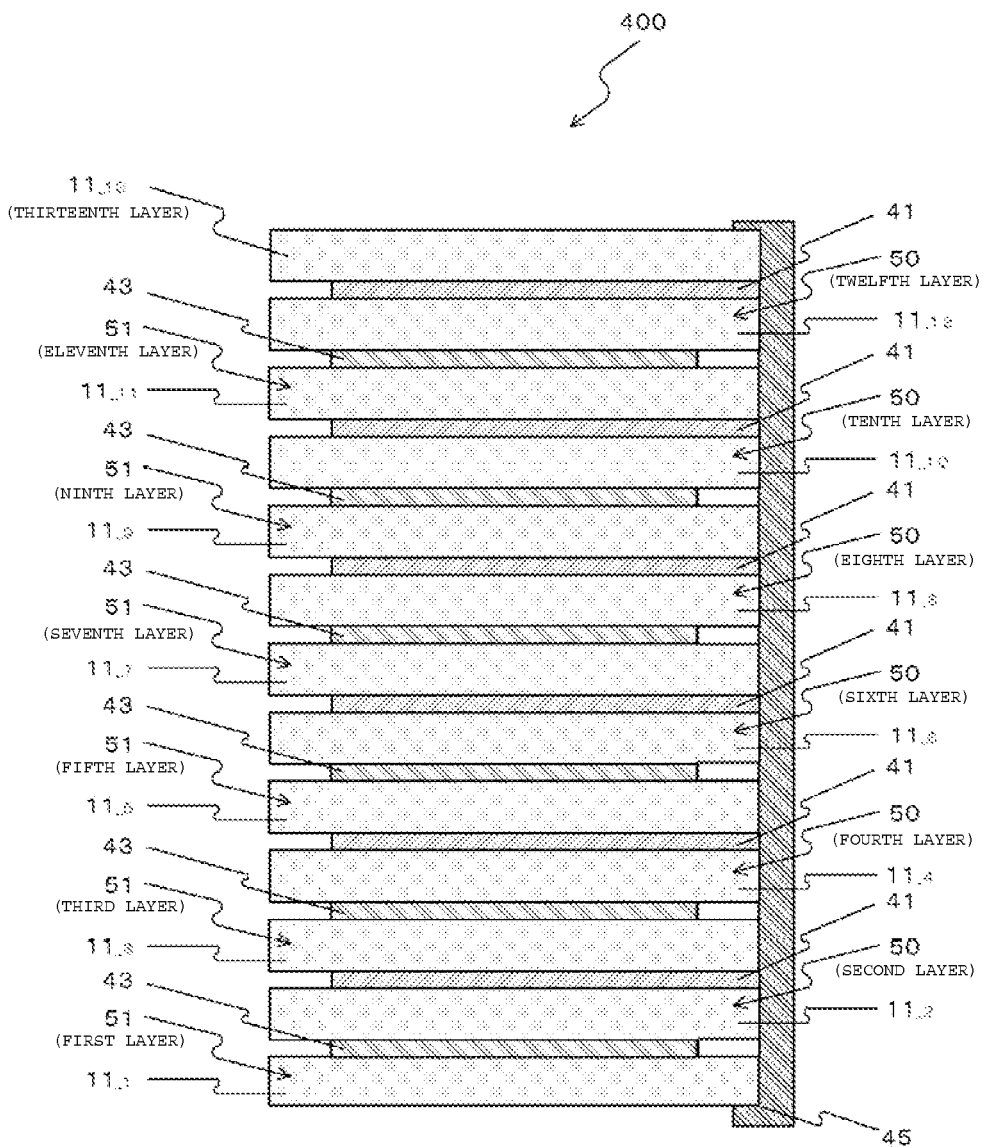
FIG. 10 is a cross-sectional view of a laminated film capacitor according to Embodiment 2.
Figure 11A:
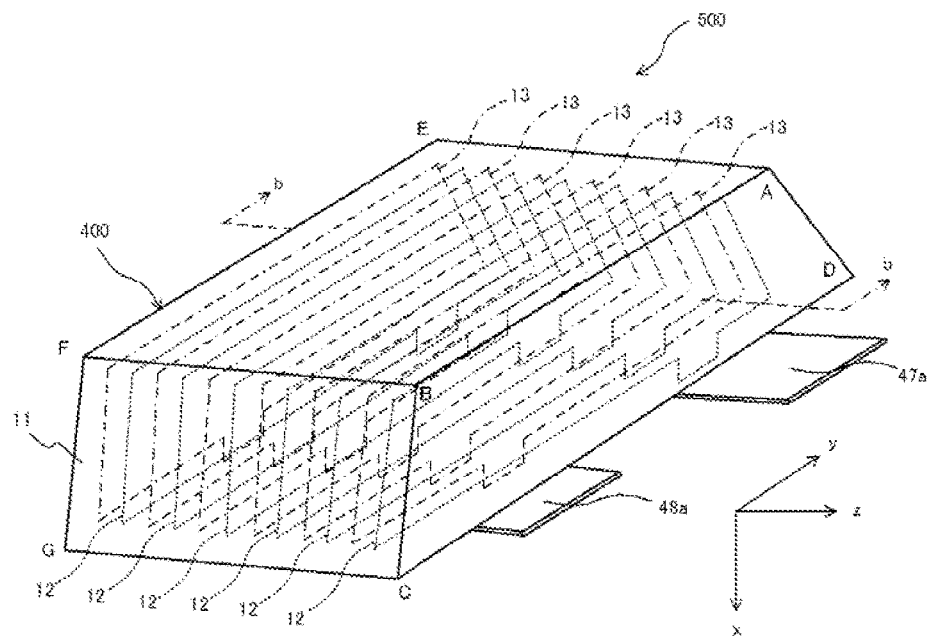
FIG. 11A is a perspective view of a capacitor module according to Embodiment 2 as viewed from one direction.

The first films 50 and second films 51 described above are alternately stacked with both ends aligned in each of the x and y directions, as shown in the cross-sectional view of FIG. 10 (cross-sectional view of b-b in FIG. 11A). Further, a dielectric film 11 of the same size as the films 50 and 51 with no metallic film formed is stacked for the uppermost layer in order to insulate and protect the internal electrodes 12 and 13.

Figure 11B:
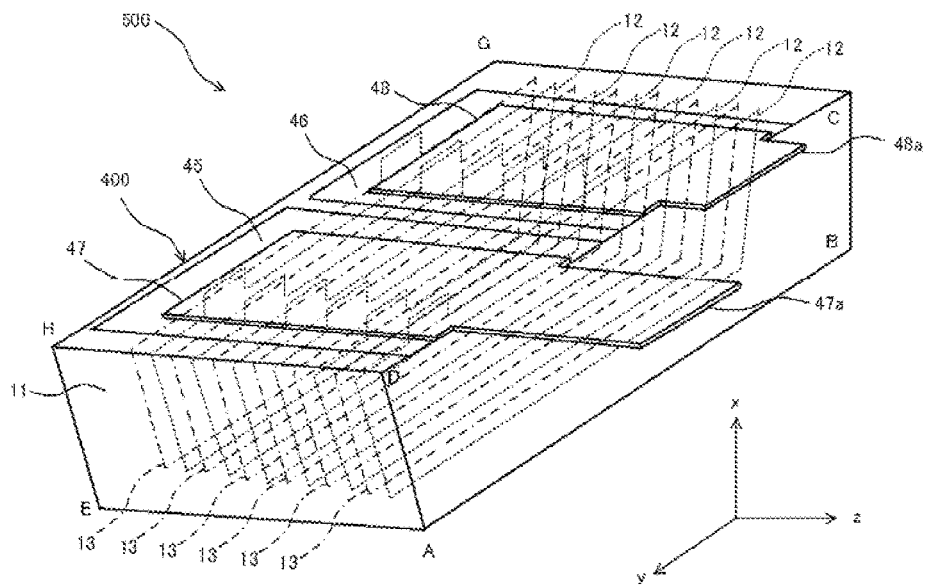
FIG. 11B is a perspective view of the capacitor module according to Embodiment 2 as viewed from another direction.

Then, the first extraction conductors 42 are covered with a metallic film of fine particles (not shown) by plating treatment, and a thermal spray material is sprayed by metallikon onto the metallic film to form a first metallikon part 45. Further, the second extraction conductors 44 are covered with a metallic film of fine particles (not shown) by plating treatment, and a thermal spray material is sprayed by metallikon onto the metallic film to form a second metallikon part 46. Thus, a laminated film capacitor 400 is completed as shown in FIGS. 11A and 11B.

Thereafter, a first external electrode (bus bar) 47 and a second external electrode (bus bar) 48 for connecting the laminated film capacitor 400 to an external circuit are attached respectively to the first metallikon part 45 and the second metallikon part 46 by, for example, pressure bonding, plating, or the like. Thus, a capacitor module 500 is completed.

The first external electrode 47 includes a first external electrode terminal 47a for external circuit connection, whereas the second external electrode 48 includes a second external electrode terminal 48a for external circuit connection. It is to be noted that the first external electrode terminal 47a is longer than the second external electrode terminal 48a in the present embodiment.

It is to be noted that the capacitor module 500 is housed in a container (a container with an outline similar to the outline of the capacitor module 500), and fixed with a sealing material filling the container. The container and sealing material are omitted in the drawings.

Further, while the laminated film capacitor 400 with the thirteen dielectric films 11 stacked is shown in FIG. 10 for facilitating the understanding of the invention, the stacking number in the laminated film capacitors 400 is not to be considered limited to this number.

The single laminated film capacitor 400 and the capacitor module 500 with terminals connected to the laminated film capacitor 400 have been described above. Next, a ring-shaped capacitor module assembly 600 composed of a plurality of capacitor modules 500 will be described.

Figure 12A:
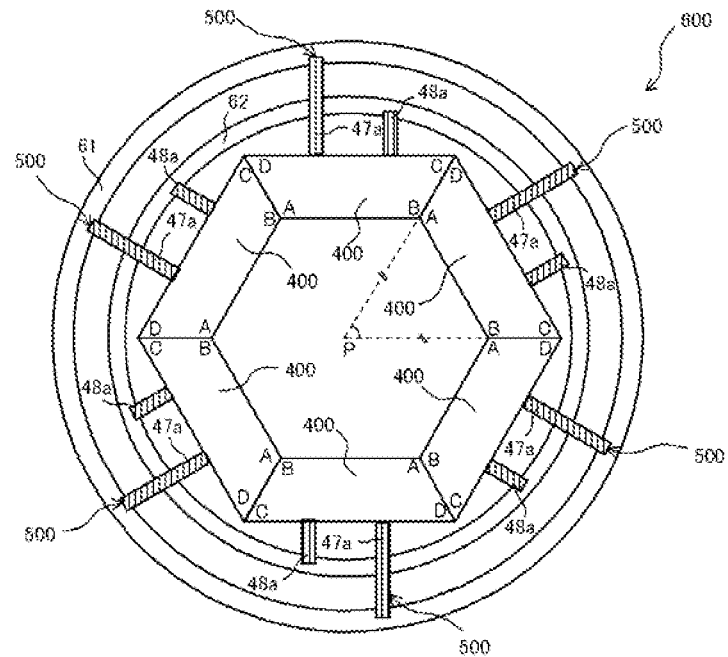
FIG. 12A is a front view of a capacitor module assembly according to Embodiment 2.
Figure 12B:
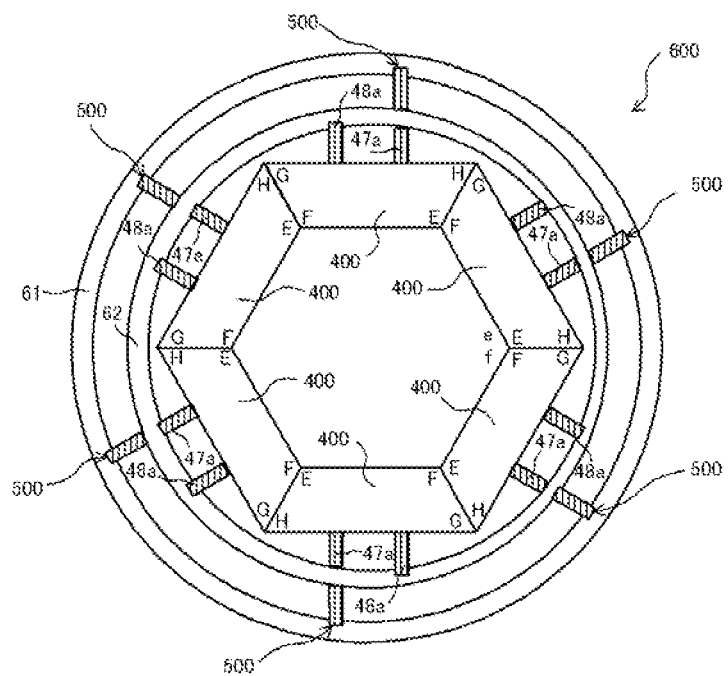
FIG. 12B is a back view thereof.

The capacitor module assembly 600 has, as shown in FIGS. 12A and 12B, a plurality of capacitor modules 400 formed in the shape of a ring by bringing one side surface (side surface ADHE) of the capacitor module 400, which is composed of an assembly of one of the sides (side ad, side bc) constituting the trapezoid and the other side surface (side surface BCGF) composed of an assembly of the other thereof into contact with one side surface (side surface ADHE) and the other side surface (side surface BCGF) of other capacitor modules 400, to arrange the modules in the same plane, as in the case of the capacitor module assembly 300 according to Embodiment 1.

The capacitor module assembly 600 is, for example, loaded onto the power conversion system 350 previously described. The power conversion system 350 includes the previously described inverter 310, and the previously described three-phase motor 320 that operates with three-phase power output from the inverter 310.

The capacitor module assembly 600 is placed next to the inverter 310, with the rotation axis 330 of the three-phase motor 320 inserted into the opening, as in the case of the capacitor module assembly 300 shown in FIG. 8 according to Embodiment 1.

The capacitor module assembly 600 includes, as shown in FIGS. 12A and 12B, for example, six capacitor modules 500, an annular first wiring 61 connected to the first external electrode terminals 47a of the respective capacitor modules 500, and an annular second wiring 62 connected to the second external electrode terminals 48a of the respective capacitor modules 500.

The first wiring 61 is, for example, an annular metal conductor for connecting the first external electrode terminals 47a to each other from the capacitor modules 500 arranged in contact with each other as described above.

The first wiring 61 is, for example, welded on the first external electrode terminals 47a.

Furthermore, the second wiring 62 is, for example, an annular metal conductor the is smaller in diameter than the ring formed by the first wiring 61, for connecting the second external electrode terminals 48a to each other from the capacitor modules 500 arranged in contact with each other as described above. The second wiring 62 is, for example, welded on the second external electrode terminals 48a.

As described above, in the case of the capacitor module assembly 600, capacitor modules 500, and laminated film capacitors 400, the laminated body has principal surfaces (face ABCD and face EFGH) in the shape of a trapezoid as viewed from the stacking direction of the first films 50 and second films 51.

For this reason, it is possible to form the shape of a ring by bringing the side surface ADHE and side surface BCGF of one laminated film capacitor 400 or one capacitor module 500 into contact with the side surface ADHE and side surface BCGF of other laminated film capacitors 400 or other capacitor modules 500 to arrange the capacitors or modules in the same plane.

When one laminated film capacitor 400 or capacitor module 500 causes trouble among the laminated film capacitors 400 or capacitor modules 500 which form the ring shape (the aspect of going around once while the opening is formed), the troublesome laminated film capacitor 400 or capacitor module 500 may be replaced. Accordingly, the laminated film capacitors 400, capacitor modules 500, and capacitor module assembly 600 according to the present embodiment allow partial replacement of the capacitors, thereby keeping down the cost for the replacement of the capacitors.

Furthermore, the intersection angle meets the relationship of 360°/n (n represents the number of capacitor modules 500) at the intersection on extensions of the two sides except the upper base and lower base of the face ABCD (or face EFGH) of the laminated film capacitor 400 or capacitor module 200.

For this reason, in the case of achieving a ring shape with a plurality of laminated film capacitors 400 or capacitor modules 500, the laminated film capacitors 400 or the capacitor modules 500 can be arranged in contact with each other without any space therebetween. Accordingly, the laminated film capacitor 400, capacitor module 500, and capacitor module assembly 600 according to the present embodiment allow efficient use of space, as compared with a case of forming a ring shape with laminated film capacitors or film capacitors including, for example, cuboid dielectric films.

While the embodiment of the present invention have been described above, this invention is not limited to the embodiments described above, but various modifications and applications can be made thereto.

While the first internal electrodes 12, 41 and the second internal electrodes 13, 44 are formed so that one electrode for forming capacitance is formed on one dielectric film 11 in the laminated film capacitors 100, 400 described above, the present invention is not to be considered limited to this formation, but more than one electrode for forming capacitance (which may be segmented electrodes) may be formed on one dielectric film 11.

In addition, when the above-described laminated film capacitors 100, 400 or capacitor modules 200, 500 are arranged in contact with each other, an opening of a desired size can be formed, and there is no need for the laminated film capacitors 100, 400 or capacitor modules 200, 500 of the same size (there may be permissible variations in size) as long as it is possible to go around once.

In addition, while an example of forming the hexagonal capacitor module assembly 300 with an opening by arranging the above-described laminated film capacitors 100, 400 (or capacitor modules 200, 500) has been provided, it is possible to form any n-polygonal capacitor module assembly. In this case, the assembly may be configured so that the intersection angle is 360°/n between extensions of the side AD and side BC of the above-described laminated film capacitor 100, 400 (or capacitor module 200, 500). For example, the intersection angle of 30° (n=12) can form a dodecagonal capacitor module assembly 300 with an opening formed. Alternatively, the intersection angle of 120° (n=3) can form a triangle capacitor module assembly 300.

In addition, while an example of the capacitor module assembly 300, 600 constituting a regular polygon has been provided in each embodiment, the present invention is not to be considered limited to this regular polygon. There is no need for the capacitor module assembly 300, 600 to be any regular polygon, as long as assembly has the shape of a ring. In addition, the planar shape of the laminated film capacitor 100, 400 may be any shape, as long as it is possible to form the shape of a ring in combination with other laminated film capacitor 100, 400.

Furthermore, the connection between the first wiring 32 and the first external electrode terminal 30*a* and the connection between the second wiring 33 and the second external electrode terminal 31*a* are achieved by welding in Embodiment 1. In addition, the connection between the first wiring 61 and the first external electrode terminal 47*a* and the connection between the second wiring 62 and the second external electrode terminal 48*a* are achieved by welding in Embodiment 2. However, the connections are not to be considered limited to this welding. More specifically, the connection between the first wiring 32 and the first external electrode terminal 30*a* and the connection between the second wiring 33 and the second external electrode terminal 31*a* may be achieved by, for example, screwing. Likewise, the connection between the first wiring 61 and the first external electrode terminal 47*a* and the connection between the second wiring 62 and the second external electrode terminal 48*a* may be achieved by, for example, screwing. This adoption of screwing can further facilitate partial replacement of the capacitors.

The present invention is considered to make a variety of embodiments and modifications possible, without departing from the broad spirit and scope of the present invention. In addition, the embodiments described above are intended to explain the present invention, but not intended to limit the scope of the present invention. More specifically, the scope of the present invention is specified by the claims, but not by the embodiments described above. Furthermore, various modifications made within the scope of the claims and within the scope of the inventive sense equivalent to the claims are considered within the scope of the present invention.

What is claimed is:

1. A laminated film capacitor comprising:
    a laminated body having a plurality of alternately stacked first dielectric films with respective first internal electrodes and second dielectric films with respective second internal electrodes, the first internal electrodes extending to a first side of the laminated body, and the second internal electrodes extending to a second side of the laminated body, the first side being opposite the second side;
    a first electrode connected to the first internal electrodes; and
    a second electrode connected to the second internal electrodes,
    wherein the laminated body has a principal surface in the shape of a trapezoid as viewed from a stacking direction of the first dielectric films and the second dielectric films, and the first side and the second side are sides of the trapezoid shape that are parallel to each other.

2. The laminated film capacitor according to claim 1, wherein the first dielectric films and the second dielectric films are offset from each other.

3. The laminated film capacitor according to claim 1, wherein the first internal electrodes include a first extraction conductor and the second internal electrodes include a second extraction conductor, the first and second extraction conductors extending to a same side of the laminated body.

4. The laminated film capacitor according to claim 3, wherein the first extraction conductor and the second extraction conductor do not overlap each other in the stacking direction.

5. A capacitor module comprising:
    a plurality of laminated film capacitors according to claim 1 in the shape of a ring by arranging non-parallel side surfaces of the trapezoid shape of the plurality of laminated film capacitors into contact with corresponding non-parallel side surfaces of adjacent laminated film capacitors so that the plurality of laminated film capacitors are in a same plane.

6. The capacitor module according to claim 5, wherein an intersection angle at an intersection on extensions of the non-parallel sides meets a relationship of 360°/n when a number of the plurality of laminated film capacitors in the same plane is denoted by n.

7. A power conversion system comprising:
    a power conversion device that converts input direct-current power to alternating-current power and outputs power;
    a motor that operates with the power output from the power conversion device; and
    the capacitor module according to claim 5, the capacitor module configured to reduce surge superimposed on a direct-current voltage input to the power conversion device, with a rotation axis of the motor inserted into an opening in the ring.

8. A power conversion system comprising:
    a power conversion device that converts input alternating-current power to direct-current power, and outputs power;
    a motor that operates with the power output from the power conversion device; and
    the capacitor module according to claim 5, the capacitor module configured to reduce surge superimposed on a direct-current voltage output from the power conversion device, with a rotation axis of the motor inserted into an opening in the ring.

9. A capacitor module comprising:
    a plurality of laminated film capacitors comprising:
        a laminated body having a plurality of alternately stacked first dielectric films with respective first internal electrodes and second dielectric films with respective second internal electrodes;
        a first electrode connected to the first internal electrodes; and
        a second electrode connected to the second internal electrodes,
        wherein the laminated body has a principal surface in the shape of a trapezoid as viewed from a stacking direction of the first dielectric films and the second dielectric films,
    the plurality of laminated film capacitors being in the shape of a ring with non-parallel side surfaces of the trapezoid shape of the plurality of laminated film capacitors in contact with corresponding non-parallel side surfaces of adjacent laminated film capacitors so that the plurality of laminated film capacitors are in a same plane,
    wherein an intersection angle at an intersection on extensions of the non-parallel sides meets a relationship of 360°/n when a number of the plurality of laminated film capacitors in the same plane is denoted by n.

10. A power conversion system comprising:
a power conversion device that converts input direct-current power to alternating-current power and outputs power;
a motor that operates with the power output from the power conversion device; and
a capacitor module having a plurality of laminated film capacitors comprising:
  a laminated body having a plurality of alternately stacked first dielectric films with respective first internal electrodes and second dielectric films with respective second internal electrodes;
  a first electrode connected to the first internal electrodes; and
  a second electrode connected to the second internal electrodes,
  wherein the laminated body has a principal surface in the shape of a trapezoid as viewed from a stacking direction of the first dielectric films and the second dielectric films,
the capacitor module configured to reduce surge superimposed on a direct-current voltage input to the power conversion device, with a rotation axis of the motor inserted into an opening in the ring.

11. A power conversion system comprising:
a power conversion device that converts input alternating-current power to direct-current power, and outputs power;
a motor that operates with the power output from the power conversion device; and
a capacitor module having a plurality of laminated film capacitors comprising:
  a laminated body having a plurality of alternately stacked first dielectric films with respective first internal electrodes and second dielectric films with respective second internal electrodes;
  a first electrode connected to the first internal electrodes; and
  a second electrode connected to the second internal electrodes,
  wherein the laminated body has a principal surface in the shape of a trapezoid as viewed from a stacking direction of the first dielectric films and the second dielectric films,
the plurality of laminated film capacitors being in the shape of a ring with non-parallel side surfaces of the trapezoid shape of the plurality of laminated film capacitors in contact with corresponding non-parallel side surfaces of adjacent laminated film capacitors so that the plurality of laminated film capacitors are in a same plane, the capacitor module configured to reduce surge superimposed on a direct-current voltage output from the power conversion device, with a rotation axis of the motor inserted into an opening in the ring.

* * * * *